(12) United States Patent
Malvern et al.

(10) Patent No.: US 7,120,548 B2
(45) Date of Patent: Oct. 10, 2006

(54) METHOD OF CALIBRATING BIAS DRIFT WITH TEMPERATURE FOR A VIBRATING STRUCTURE GYROSCOPE

(75) Inventors: Alan R Malvern, Plymouth (GB); Richard H. W. Reilly, Plymouth (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 10/523,399

(22) PCT Filed: Nov. 12, 2003

(86) PCT No.: PCT/GB03/04895

§ 371 (c)(1),
(2), (4) Date: Feb. 3, 2005

(87) PCT Pub. No.: WO2004/046649

PCT Pub. Date: Jun. 3, 2004

(65) Prior Publication Data

US 2005/0256659 A1   Nov. 17, 2005

(30) Foreign Application Priority Data

Nov. 20, 2002  (GB) ................................. 0227098.1

(51) Int. Cl.
*G01C 17/38* (2006.01)
*G01P 21/00* (2006.01)
*G06F 19/00* (2006.01)

(52) U.S. Cl. ............................................. 702/96; 73/2
(58) Field of Classification Search .................. 702/96
See application file for complete search history.

(56) References Cited

U.S. PATENT DOCUMENTS 5,481,913 A   1/1996   Ito et al.

(Continued)

FOREIGN PATENT DOCUMENTS

EP   0 592 171   4/1994

(Continued)

OTHER PUBLICATIONS

Jau Hsiung Wang and Yang Gao, Fuzzy Logic Expert Rule-based Multi-Sensor Data Fusion for Land Vehicle Attitude Estimation.*

(Continued)

*Primary Examiner*—John Barlow
*Assistant Examiner*—Sujoy Kundu
(74) *Attorney, Agent, or Firm*—Nixon & Vanderhye P.C.

(57) ABSTRACT

A method of calibrating bias drift with operating temperature over an operating temperature range for a vibrating structure gyroscope. The method includes the steps of measuring, over an operating temperature range of the vibrating structure gyroscope, primary drive means voltage P, vibrating structure frequency f, secondary drive quadrature component values $S_q$ which is a measure of real component bias errors with temperature, and secondary drive real component values $S_r$ which is a measure of change in bias, that is the zero inertial rate offset, of the vibrating structure gyroscope with temperature, substituting the values obtained in the relationship $$S_r = \sum_k f^k \sum_l S_q^l \sum_m P^m a_{klm}$$

Figure 1:
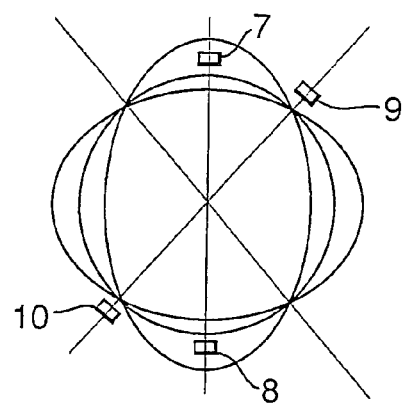

where $a_{klm}$ are bias calibration coefficients for the vibrating structure gyroscope over the operating temperature range, and calculating from the relationship the coefficients $a_{klm}$ to provide a set of bias calibration coefficients for the vibrating structure gyroscope over the tested operating temperature range.

3 Claims, 3 Drawing Sheets

U.S. PATENT DOCUMENTS

| | | |
|---|---|---|
| 5,712,427 A | 1/1998 | Matthews |
| 5,987,984 A | 11/1999 | Artzner et al. |
| 6,343,509 B1 | 2/2002 | Fell et al. |
| 6,577,952 B1 * | 6/2003 | Geier et al. ............... 701/214 |
| 2002/0165687 A1 | 11/2002 | Goto et al. |

FOREIGN PATENT DOCUMENTS

| | | |
|---|---|---|
| EP | 1 052 478 | 11/2000 |
| GB | 2 327 265 | 1/1999 |

OTHER PUBLICATIONS

S.K. Hong, "Compensation of Nonlinear Thermal Bias Drift of Resonant Rate Sensor Using Fuzzy Logic" *Sensors and Actuators*, vol. 78, No. 2-3, Dec. 1999, pp. 143-148.

L.O. Thielman et al, "Proposed IEEE Coriolis Vibratory Gyro Standard and Other Inertial Sensor Standards" IEEE 2002 Position Location and Navigation Symposium, Apr. 2002, pp. 351-358.

* cited by examiner

METHOD OF CALIBRATING BIAS DRIFT WITH TEMPERATURE FOR A VIBRATING STRUCTURE GYROSCOPE

This application is the US national phase of international application PCT/GB2003/004895, filed in English on 12 Nov. 2003, which designated the US. PCT/GB2003/004895 claims priority to GB Application No. 0227098.1 filed 20 Nov. 2002. The entire contents of these applications are incorporated herein by reference.

This invention relates to a method of calibrating bias drift with operating temperature over an operating temperature range for a vibrating structure gyroscope.

Vibrating structure gyroscopes are known in many forms such as tuning fork, cylinder or planar ring structures. Planar ring structure gyroscopes can be made of silicon with a silicon vibrating ring structure movably mounted by a number of radially compliant legs on a fixed support. Drive means are provided for putting and maintaining the ring structure in vibratory motion at the natural resonant mode of the structure. Pick-off means are included for detecting vibration of the vibrating structure, giving a signal proportional to velocity.

Such a silicon planar ring structure gyroscope is relatively simple to manufacture in bulk with low production costs but only has a limited bias drift performance of about 1 degree per second over its typical operating temperature range of between −40° C. and +80° C. Whilst this performance is satisfactory for civil automotive market needs it would be advantageous if the bias drift performance could be improved to the order of between 1 to 10 degrees per hour which would enable such an improved performance gyroscope to be utilised for other applications such as navigation. Bias drift is defined as the variation of the gyroscope output signal as a function of time and temperature in the absence of an applied rotation rate.

A simple way of improving the performance of the bias drift over temperature would be to model the bias with an external temperature sensor with the use of a polynomial representation as below:

$$B = a_0 + a_1 S(T) + a_2 S(T)^2 + a_3 S(T)^3 + \quad (1)$$

where S(T) is the signal representing temperature from the temperature sensor and B the bias. In order to carry out this calibration process the vibrating structure gyroscope is placed inside a temperature chamber and over a period of time cycled over the operational temperature envelope, data-logging both the bias (while the gyro is stationary) and the output of the temperature sensor. The rate sensor is held fixed during the period of testing.

A multiple linear regression (such as available from typical spreadsheet such as Excel) can be used to determine the coefficients of the fit in a least squares fit manner from data over the operational temperature range. It is then assumed that the fit parameters $a_1$, $a_2$ etc. are constant with time, so that this one off calibration can then be used for the tested calibration gyroscope in operation.

Figure 7:
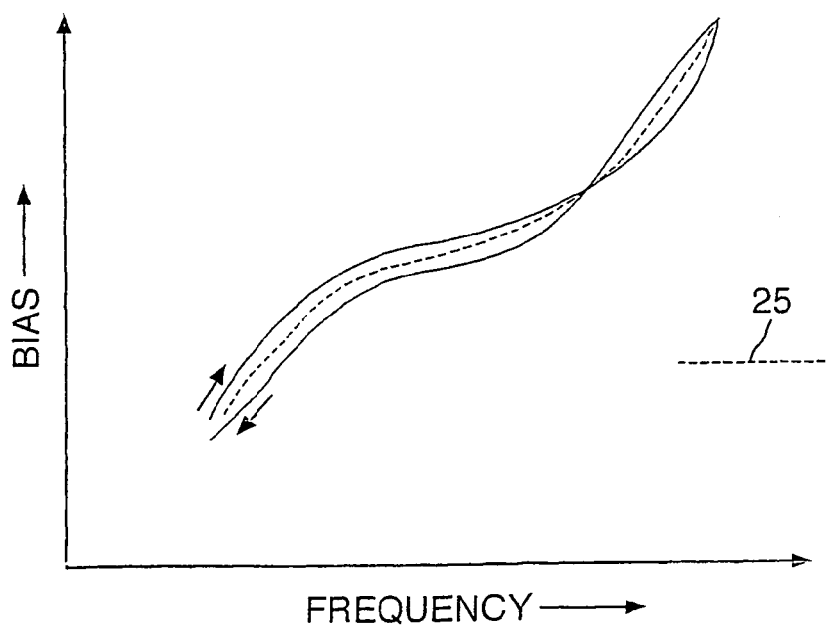

The problem with this temperature sensor approach is that it is not closely related to the gyroscope characteristics which accounts for the limited scope of improvement that can be achieved. A temperature sensor will not be in exactly the same physical position as the gyroscope so there will inevitably be temperature differences especially under dynamic temperature environments. This will result in either a lead or lag of the temperature sensor with respect to the gyro results in apparent hysteresis in the modelling with increased errors as shown in FIG. 7 of the accompanying drawings, as will be later described There is thus a need for a generally improved method of calibrating bias drift with temperature for a vibrating structure gyroscope which at least minimises these problems.

According to one aspect of the present invention there is provided a method of calibrating bias drift with operating temperature over an operating temperature range for a vibrating structure gyroscope having a substantially planar, substantially ring shaped silicon vibrating structure, primary drive means for putting and maintaining the vibrating structure in carrier mode resonance, and secondary drive means for nulling response mode motion of the vibrating structure, which secondary drive means includes means to separate a detected response mode motion signal into a real component induced by applied rotation of the vibrating structure gyroscope and a quadrature component which is an error term indicative of error mismatch between carrier mode resonance frequency and response mode resonance frequency, including the steps of measuring, over an operating temperature range of the vibrating structure gyroscope, primary drive means voltage P which is a measure of change in quality factor Q of the vibrating structure with temperature, vibrating structure frequency f which is a measure of change of temperature of the vibrating structure, secondary drive quadrature component values $S_q$ which is a measure of real component bias errors with temperature, and secondary drive real component values $S_r$ which is a measure of change in bias, that is the zero inertial rate offset, of the vibrating structure gyroscope with temperature substituting the values obtained in the relationship $$S_r = \sum_k f^k \sum_l S_q^l \sum_m P^m a_{klm}$$

where $a_{klm}$ are bias calibration coefficients for the vibrating structure gyroscope over the operating temperature range, and calculating from the relationship the coefficients $a_{klm}$ to provide a set of bias calibration coefficients for the vibrating structure gyroscope over the tested operating temperature range.

Preferably the coefficients $a_{klm}$ are calculated from the relationship by carrying out a multiple linear regression on the relationship.

Conveniently the coefficients $a_{klm}$ are calculated by Kalman filtering.

Figure 2:
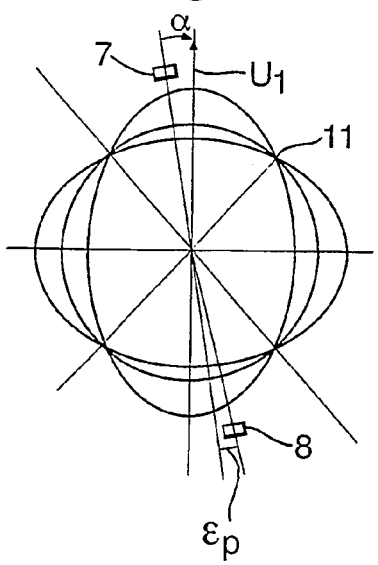
Figure 3:
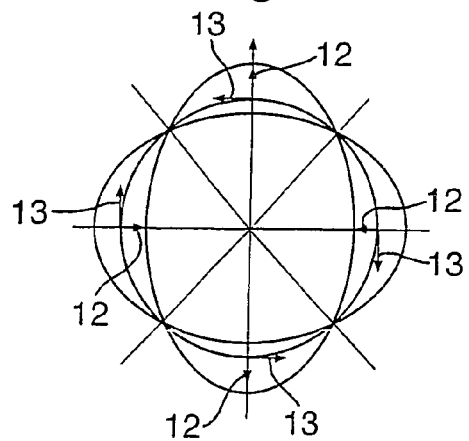
Figure 4:
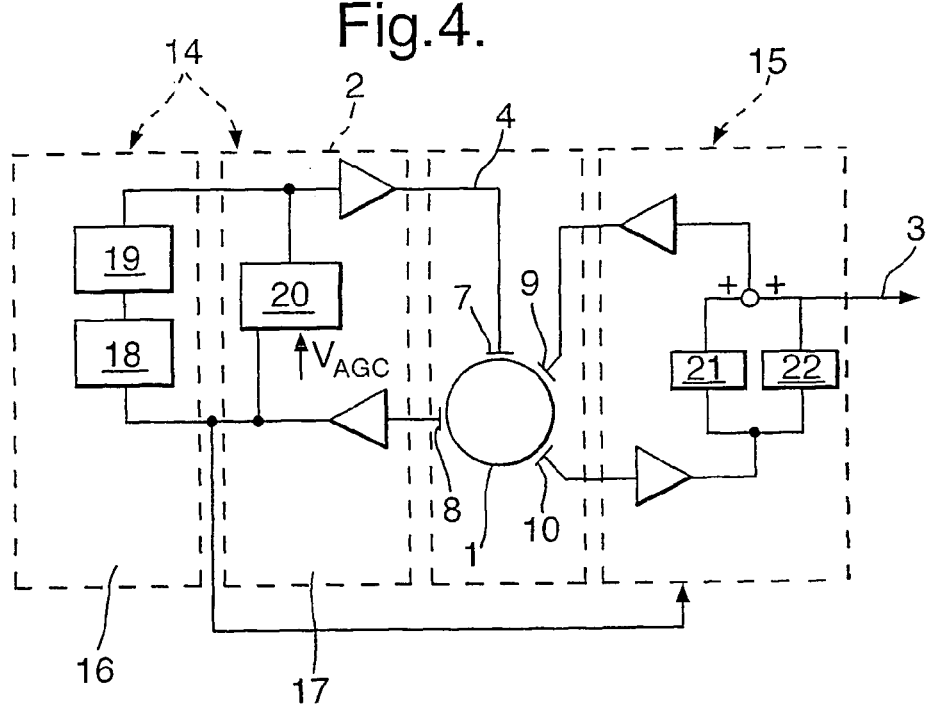
Figure 5:
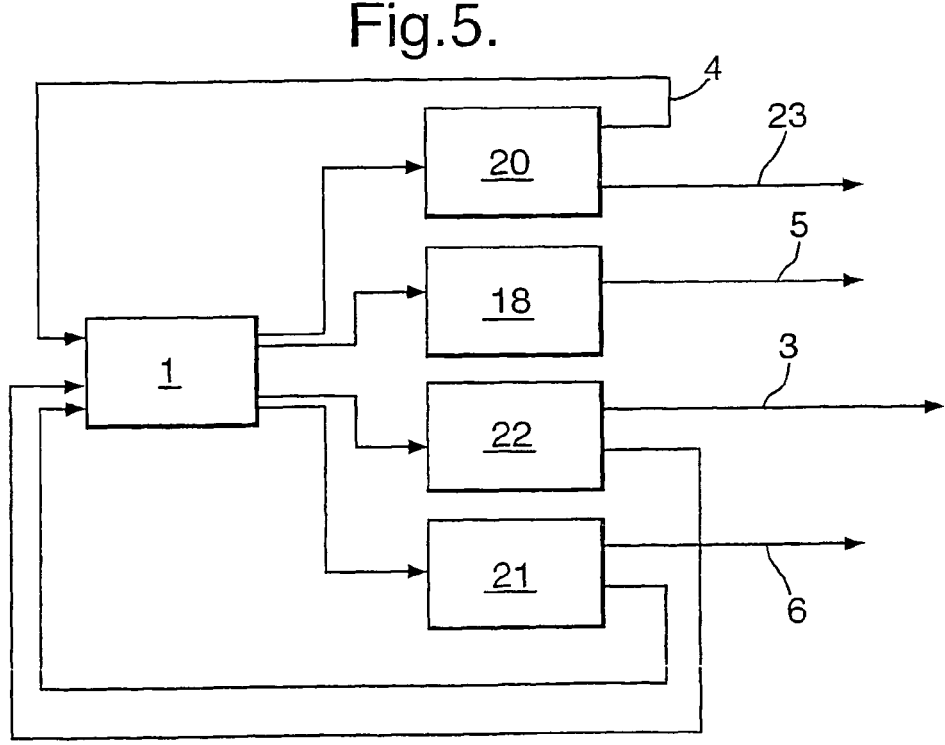
Figure 6:
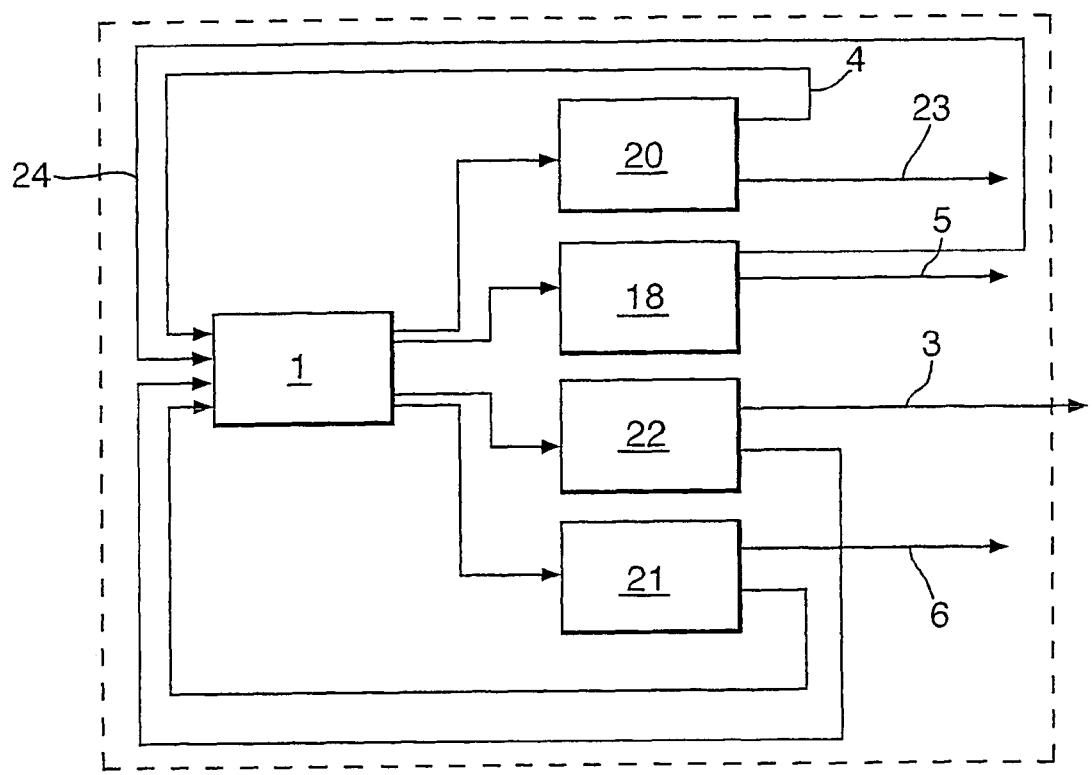

For a better understanding of the present invention, and to show how the same may be carried into effect, reference will now be made, by way of example, to the accompanying drawings, in which:

FIG. 1 is a graphic illustration of the normal mode vibration pattern for a silicon vibrating structure gyroscope, FIG. 2 is a graphic illustration of the vibration pattern for a silicon vibrating structure gyroscope when there is misalignment between the normal modes and the primary drive and pick-off means by an angle $\propto$, FIG. 3 is a graphic illustration of the Corriolis Effect on the primary mode vibration pattern for a silicon vibrating structure gyroscope, FIG. 4 is a diagrammatic representation of a conventional electronic control circuit for a conventional vibrating structure gyroscope having a silicon ring shaped vibrating structure, FIG. 5 is a block function diagram of the control circuit of FIG. 4, FIG. 6 is a block function diagram of a modified version of the control circuit of FIG. 4, FIG. 7 is a graphical representation of bias versus frequency showing the hysteresis effect on bias over temperature.

Referring now to FIGS. 1 to 4 of the accompanying drawings a silicon ring shaped vibrating structure 1 has two fundamental modes, differing by, typically, less than 1 Hz in frequency. Ideally the primary mode is driven at its natural frequency, and the secondary mode is suppressed. In practice the ring shaped structure 1 oscillates at a frequency between the primary and secondary natural frequencies, and both modes are excited. The magnitude of oscillation is held approximately constant across the full operating temperature range. An AGC (automatic gain control) loop 2 operates to control the amplitude of the primary motion.

The gyro operating principle involves the use of Coriolis forces coupling the primary and secondary modes when inertial rotation occurs about an axis normal to the plane of the ring shaped structure 1. The force needed to suppress the Coriolis force is proportional to the inertial angular rate.

The main error driver is the angular misalignment of the primary drive and the primary mode as shown in FIG. 1. This misalignment angle varies across the temperature range, and is subject to hysteresis. It is not simply a function of present temperature, but is a hysteretic, stochastic function of temperature history, which is unknown. It is this hysteresis that gives rise to errors that cannot be calibrated out off-line by conventional means. Apart from the output of measured gyro rate 3 (corrupted by unknown errors), additional measurements are available from the primary drive voltage 4, frequency 5, and secondary quadrature drive or bias 6. These measurements are known to be a function of the various error drivers.

FIG. 1 of the accompanying drawings shows the primary normal mode, with primary drive means 7 and primary pick-off means 8. Also shown, at 45 degrees to the primary mode, are the axes of the secondary mode with secondary drive means 9 and secondary pick-off means 10. The mode position and driver and pick-off positions are all shown in their ideal positions. The secondary mode is rotated 45 degrees relative to the primary.

Misalignment of the normal modes with the drivers and pick-offs by an angles, as shown in FIG. 2, results in a combination of the primary and secondary modes being used to null motion at 45 degrees to the primary drive means 7. The primary pick-off means 8 will detect mainly the primary mode, but also the secondary mode, to a lesser degree. The primary drive is the reference direction from the gyro centre, from which all other angles are measured.

Due to nominal symmetry of the ring shaped structure 1, it appears that the primary mode could take up any position on the structure 1, however minor asymmetries may determine its actual position. Thus the mode position tends to be locked to one angle α due to anisotropies around the ring shaped structure 1. U, in FIG. 2 represents the primary mode amplitude and 11 the primary mode node.

FIG. 3 shows the velocity vectors 2 at four points for the primary mode. Due to Coriolis effect in the presence of rotation, there are D'Alembert's forces 13 applied at each point. Clearly, the primary mode motion in the presence of rotation gives rise to forces, which drive the secondary mode, and by symmetry, the secondary mode motion in the presence of rotation gives rise to forces. which drive the primary mode.

The pattern of Coriolis acceleration suggests that the secondary mode will be driven by D'Alembert's forces. This leads to a cross-coupling between the primary and secondary normal modes, in both directions. There is a gain associated with this effect, the Bryan gain. Thus, for a rotating ring structure there is a special effect, referred to here as the Bryan Effect, which forms the physical basis of the gyro's operation.

Typically a silicon ring shaped vibrating structure gyroscope is controlled by an electronic control system as shown in FIG. 4 of the accompanying drawings. This has a primary loop 14 and a secondary loop 15. Making up the primary loop 14 is a frequency control loop 16 and an amplitude control loop 17. The loop 16 contains a phase locked loop 18 and a voltage controlled oscillator 19. The loop 17 contains an automatic gain control 20 to stabilise the amplitude of motion, having an input $V_{(agc)}$ voltage to set the amplitude of motion. Loop 14 is connected between the primary pick-off means 8 and the primary drive means 7. The secondary loop 15 is connected between the secondary pick-off means 10 and the secondary drive means 9 and acts as a demodulating/remodulating null control loop. To this end it contains a quadrature component loop 20 and a real component loop 21.

FIG. 5 shows a block function diagram of the control system of FIG. 4, in which like parts have been given like reference numbers. The output from the automatic gain control 20 is indicated at 23.

FIG. 6 shows a block function diagram of the control system of FIG. 4, in which like parts have been given like reference numbers, but also in which there is an extra servo loop 24 connecting the phase locked loop 18 to the gyroscope vibrating structure 1 to ensure that there is a 90° phase shift between the primary drive voltage 4 and the primary pick-off signal.

Over temperature, due to the change of modulus of the silicon and the size of the ring structure 1, there is a change of resonance frequency of −0.4 Hz/C. With a typical phase error of the loop of 0.5 degrees, the temperature of the ring structure can be determined to an accuracy of 0.01 Hz corresponding to 0.025 C. The frequency of vibration of the structure 1 can be determined very accurately during calibration and this implies that the temperature environment of the ring structure can be very precisely determined with no time lag between the "temperature sensor" (the frequency of the ring) and the ring structure itself.

The frequency of the ring structure 1 when it is vibrating at resonance is a good measure of the actual temperature of the ring structure with a typical coefficient of −0.4 Hz/C. The frequency and the gyro bias with the gyroscope stationary in a temperature chamber can be recorded over the operational range, which is typically −40 C and an improved model for the gyro bias can be written as:

$$b = \Sigma b_n f^n \quad (2)$$

$$s = \Sigma s_n f^n \quad (3)$$

where f is the frequency of the ring. This again is a calibration which is carried out over the operational temperature range of the gyro with data being collected for the gyro bias b, scale factor s and frequency f of the ring structure as a function of time when a typical temperature profile as in FIG. 7 is found.

Whilst this model results in an improvement in the gyro bias performance over the external temperature recording process, it cannot eliminate the effects of hysteresis of bias over temperature as there is no time history in the model.

FIG. 7 shows that for variation in temperature there is a hysteresis effect in that the solid line in the graph shows a deviation depending upon whether the temperature is increasing or decreasing, as shown by the arrows, from a mean track 25. Hence this process for calibrating bias drift is inherently inaccurate.

With reference to the block diagram in FIG. 6, there are a number of measurands in the gyro as follows:
a) primary drive voltage 4, given the symbol P
b) Frequency 5, given the symbol f
c) Secondary quadrature drive levels 6, given the symbol $S_q$, and
d) Secondary real drive 3, which is the normal rate output $S_r$.

The primary drive voltage P is a measure of the drive required to maintain the primary oscillation of vibrating structure 1 at a fixed amplitude. As the temperature changes the Q of the gyroscope decreases with increasing temperature requiring a higher drive level. Thus the primary drive voltage P is a measure of 1/Q as a function of temperature, and this knowledge can be used to take out the effects of temperature variation of Q. The frequency, as described before, is a measure of ring structure temperature and represents a very accurate indicator. The secondary quadrature signal $S_q$ is related to error effects of the real bias. In particular the ring shaped vibrating structure 1 is known to have two eigen modes.

These modes are not naturally aligned to the primary and secondary drive axes, but have a misalignment angle α. When the primary drive is energised, if α is not equal to zero then a linear combination of the two eigen modes is excited. These eigen modes are characterised by resonant frequencies $f_1$ and $f_2$ and quality factors $Q_1$ and $Q_2$. If the two modes do not have the same resonant frequency, and the angle α is not equal to zero then a quadrature drive signal is required to null out the quadrature motion. It can be shown that the quadrature level is related to the mode angle α.

There are also errors in the bias, the zero inertial rate offset of the gyro, which is measured by $S_r$. It is known that when the Q factors of the two modes are different, then there is a bias error proportional to sin 4α and the values of ΔQ. It is seen that there is thus a correlation between the value of $S_q$ and the proportion of the error in $S_r$ due to ΔQ. Thus the variation of $S_r$ will track the variation of $S_q$, so that the error due to delta Q in gyro bias can be compensated.

Over the temperature range of ±80° this may be written as:

$$S_r = \Sigma a_n S_q^n \quad (4)$$

where $a_n$ is a fit coefficient from a least squares fit.

In a similar way the gyro bias will have error terms which vary as the Q of the mode changes, which is measured by the primary drive level, and this can be written:

$$S_r = \Sigma b_m P^m \quad (5)$$

Putting all these terms together we can write:

$$S_r = \sum_k f^k \sum_l S_q^l \sum_m P^m a_{klm} \quad (6)$$

Note that in this expression the values of k, l and m can be both positive and negative.

In order to cover the major errors that are known on the gyro typically a total of 7 terms are used.

These cover errors such as:
a) phase error of the primary drive with respect to the secondary pick off. These are electronic phase errors with a typical value of 0.5 degrees due to limited pre amplifier bandwidth and time delays through integrated circuits.
b) Effects of delta Q as discussed above
c) Effects of the angle offset between the secondary pick off and primary drive
d) Effects of bias voltage to null the original bias offset
e) Effects of inductive pick up between primary drive and secondary pick off
f) Effects of capacitive pick up between primary drive and secondary pick off
g) Effects of magnetic field anomalies.

By a suitable choice of the powers of k, l and m it is possible to model these 7 error terms using the three measurands. During the calibration process the values of the measurands—$S_r$, $S_q$, P and f are data-logged as the temperature varies over a range of ±80° C. A multiple linear regression is carried out to determine the coefficients $a_{klm}$.

Other analysis techniques can be used to derive the coefficients from the data such as Kalman filtering techniques.

As the measurands are correlated to the gyro bias errors drivers, measurements of the these terms will improve the bias compensation. The polynomial form given above is then linked back to physical error sources (as discussed), and the closer the calibration is to the physical reality then the better the modelling that can be achieved.

As a result it is now is possible to model gyro bias hysteresis, which a simple polynomial model cannot achieve. This is due to the correlation of real and quadrature bias in particular. Therefore if there is hysteresis in real bias there will generally be a corresponding hysteresis in quad bias as the error mechanisms (such as variation of alpha and hysteresis of alpha with temperature) are common to these two.

In practice the calibration coefficients $a_{klm}$ are established for a specific gyroscope by applying in an oven, a desired temperature sequence to the gyroscope. Test data, including the previously specified measurands is recorded and a set of bias calibration coefficients established for the gyroscope.

The invention claimed is:

1. A method of calibrating bias drift with operating temperature over an operating temperature range for a vibrating structure gyroscope having a substantially planar, substantially ring shaped silicon vibrating structure, primary drive means for putting and maintaining the vibrating structure in carrier mode resonance, and secondary drive means for nulling response mode motion of the vibrating structure, which secondary drive means includes means to separate a detected response mode motion signal into a real component induced by applied rotation of the vibrating structure gyroscope and a quadrature component which is an error term indicative of error mismatch between carrier mode resonance frequency and response mode resonance frequency, including the steps of measuring, over an operating temperature range of the vibrating structure gyroscope, primary drive means voltage P which is a measure of change in quality factor I.Q of the vibrating structure with temperature, vibrating structure frequency f which is a measure of change of temperature of the vibrating structure, secondary drive quadrature component values $S_q$ which is a measure of real component bias errors with temperature, and secondary drive real component values $S_r$ which is a measure of change in bias, that is the zero inertial rate offset, of the vibrating structure gyroscope with temperature, substituting the values obtained in the relationship $$S_r = \sum_k f^k \sum_l S_q^l \sum_m P^m a_{klm}$$

where $a_{klm}$ are bias calibration coefficients for the vibrating structure gyroscope over the operating temperature range, calculating from the relationship the coefficients $a_{klm}$ to provide a set of bias calibration coefficients for the vibrating structure gyroscope over the tested operating temperature range, and applying the bias calibration coefficients to the vibrating structure gyroscope.

2. A method according to claim 1, in which the coefficients $a_{klm}$ are calculated from the relationship by carrying out a multiple linear regression on the relationship.

3. A method according to claim 1, in which the coefficients $a_{klm}$ are calculated by Kalman filtering.

* * * * *